United States Patent
Song et al.

(10) Patent No.: US 11,427,147 B2
(45) Date of Patent: Aug. 30, 2022

(54) DRIVER AIRBAG APPARATUS FOR VEHICLE

(71) Applicant: HYUNDAI MOBIS CO., LTD., Seoul (KR)

(72) Inventors: Min June Song, Seoul (KR); Seok Hoon Ko, Yongin-si (KR); Do Hyoung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/952,909

(22) Filed: Nov. 19, 2020

(65) Prior Publication Data

US 2022/0063539 A1    Mar. 3, 2022

(30) Foreign Application Priority Data

Aug. 26, 2020    (KR) .................. 10-2020-0108102

(51) Int. Cl.
*B60R 21/203* (2006.01)
*B60R 21/217* (2011.01)
*B60R 21/2165* (2011.01)

(52) U.S. Cl.
CPC ........ *B60R 21/203* (2013.01); *B60R 21/2176* (2013.01); *B60R 21/21656* (2013.01); *B60R 2021/2177* (2013.01)

(58) Field of Classification Search
CPC .............. B60R 21/203; B60R 21/2034; B60R 2/21656; B60R 2021/21543
See application file for complete search history.

(56) References Cited

U.S. PATENT DOCUMENTS

| 5,647,610 A * | 7/1997 | Nagata | B60Q 5/003 |
| | | | 280/731 |
| 6,394,489 B1 * | 5/2002 | Faigle | B60R 21/2035 |
| | | | 280/731 |
| 6,739,620 B2 * | 5/2004 | Derrick | B60Q 1/1484 |
| | | | 280/731 |
| 9,193,375 B2 * | 11/2015 | Schramm | B60K 37/06 |
| 10,144,383 B2 * | 12/2018 | Bodtker | H04N 9/12 |
| 10,322,682 B2 * | 6/2019 | Faist | G06F 3/0221 |

(Continued)

FOREIGN PATENT DOCUMENTS

DE   10-2017-120770    3/2019
EP      0844143 B1    10/2002

(Continued)

*Primary Examiner* — Barry Gooden, Jr.
(74) *Attorney, Agent, or Firm* — DLA Piper LLP (US)

(57) ABSTRACT

Disclosed is a driver airbag apparatus for a vehicle configured to be deployed from the region behind a steering wheel, having at the center portion thereof an obstacle, toward the region in front of the steering wheel while avoiding the obstacle. The driver airbag apparatus includes an airbag housing disposed behind the steering wheel, an airbag cushion accommodated in the airbag housing and configured to be deployed by gas injected thereinto toward the region in front of the steering wheel through a space between the obstacle and the steering wheel, and a housing cover coupled to the airbag housing so as to cover an opening in the airbag housing and configured to be ruptured by the deployment pressure of the airbag cushion so as to open the airbag housing to a limited angle toward the region in front of the steering wheel.

18 Claims, 9 Drawing Sheets

(56) References Cited

U.S. PATENT DOCUMENTS

| | | | |
|---|---|---|---|
| 10,370,021 B2* | 8/2019 | Gong | B60K 37/06 |
| 10,583,855 B2* | 3/2020 | Toddenroth | B60R 21/2035 |
| 10,857,884 B2* | 12/2020 | Derrick | G06F 3/14 |
| 11,072,301 B2* | 7/2021 | Klaenhammer | B60R 21/2035 |
| 2002/0084634 A1* | 7/2002 | Adomeit | B60R 21/203 |
| | | | 280/731 |
| 2003/0064748 A1* | 4/2003 | Stulberger | H04M 1/6083 |
| | | | 455/569.2 |
| 2006/0162485 A1* | 7/2006 | Leng | B62D 1/06 |
| | | | 74/552 |
| 2006/0202446 A1* | 9/2006 | Chavez | B60R 21/21656 |
| | | | 280/728.3 |
| 2009/0189373 A1* | 7/2009 | Schramm | B60R 11/0264 |
| | | | 280/731 |
| 2014/0131984 A1* | 5/2014 | Zahn | B60R 21/2035 |
| | | | 280/728.3 |
| 2016/0001807 A1* | 1/2016 | Hans | B60R 11/0229 |
| | | | 345/173 |
| 2017/0072984 A1* | 3/2017 | Gong | B60R 21/203 |
| 2017/0274859 A1* | 9/2017 | Heurlin | B60R 21/2338 |
| 2018/0086297 A1* | 3/2018 | Bodtker | B60K 35/00 |
| 2018/0194319 A1* | 7/2018 | Lesnik | B60R 21/235 |
| 2018/0244196 A1* | 8/2018 | Jablonski | B60Q 3/20 |
| 2019/0039550 A1* | 2/2019 | Eckert | B60R 21/2171 |
| 2019/0071112 A1* | 3/2019 | Toddenroth | B60R 21/2032 |
| 2019/0381962 A1* | 12/2019 | Sheldon | B62D 1/183 |
| 2020/0148156 A1 | 5/2020 | Kwon | |
| 2020/0171947 A1* | 6/2020 | Derrick | G06F 3/041 |
| 2020/0172037 A1* | 6/2020 | Klaenhammer | B60R 11/0264 |
| 2020/0331417 A1* | 10/2020 | Kobata | B62D 1/04 |
| 2021/0046893 A1* | 2/2021 | Rosenberg | B60R 21/08 |

FOREIGN PATENT DOCUMENTS

| | | |
|---|---|---|
| JP | H08-295197 A | 11/1996 |
| KR | 10-2012-0044831 A | 5/2012 |
| KR | 10-2020-0055322 A | 5/2020 |

* cited by examiner

DRIVER AIRBAG APPARATUS FOR VEHICLE

CROSS-REFERENCE TO THE RELATED APPLICATION

This application claims priority from Korean Patent Application No. 10-2020-0108102, filed on Aug. 26, 2020, in the Korean Intellectual Property Office, the disclosure of which is incorporated herein by reference in its entirety.

BACKGROUND OF THE INVENTION

1. Field of the Invention

The present invention relates to a driver airbag apparatus for a vehicle, and more particularly to a driver airbag apparatus that induces an airbag cushion to be deployed in a manner that avoids a display device mounted to a steering wheel of a vehicle.

2. Description of the Related Art

Vehicles are equipped with various types of airbag apparatuses in order to protect occupants. Among various types of airbag apparatuses, a driver airbag apparatus is mounted to a steering wheel.

A driver airbag apparatus is provided to protect the upper body of the driver. In greater detail, an inflator explodes in response to a control signal from an airbag control unit, and an airbag cushion is expanded from the steering wheel by the pressure of airbag gas discharged from the inflator and is deployed toward the driver. The deployed airbag cushion protects the upper body of the driver.

When autonomous driving technology, by which a vehicle is capable of autonomously travelling to a destination by itself without manipulation of the steering wheel, the accelerator, the brake, or the like by a driver, is commercialized, a driver will be able to select a relaxation mode to take a rest while traveling in a vehicle, rather than directly driving the vehicle. The steering wheel may be provided with a display device so as to allow the driver to rest comfortably in the relaxation mode.

In the event of an accident, the driver airbag cushion is expanded toward the region in front of the display device and is deployed toward the driver. However, in the case in which the airbag cushion breaks the display device while being deployed, the fragments of the display device may scatter and hurt the driver's body.

In order to solve this problem, an airbag apparatus having a structure in which an airbag cushion is deployed in a manner that avoids a display device has been developed. However, it is still difficult to deploy an airbag cushion in a desired direction.

The information disclosed in this Background of the Invention section is only for enhancement of understanding of the general background of the invention and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide an airbag apparatus that limits the angle to which a cover of an airbag housing is opened when the airbag apparatus operates, thereby limiting the direction in which an airbag cushion is deployed.

In accordance with the present invention, the above and other objects can be accomplished by the provision of a driver airbag apparatus for a vehicle configured to be deployed from the region behind a steering wheel, having at the center portion thereof an obstacle, toward the region in front of the steering wheel while avoiding the obstacle, the driver airbag apparatus including an airbag housing disposed behind the steering wheel, an airbag cushion accommodated in the airbag housing and configured to be deployed by gas injected thereinto toward the region in front of the steering wheel through a space between the obstacle and the steering wheel, and a housing cover coupled to the airbag housing so as to cover an opening in the airbag housing and configured to be ruptured by the deployment pressure of the airbag cushion so as to open the airbag housing to a limited angle toward the region in front of the steering wheel.

The obstacle located at the center portion of the steering wheel may be a display device mounted to the steering wheel.

The opening in the airbag housing may face the upward direction of the steering wheel, and the housing cover may be rotated relative to the airbag housing such that the front end portion thereof moves upwards and such that the airbag housing is opened toward the region in front of the steering wheel.

The rear end portion of the housing cover may extend backwards beyond the rear end portion of the airbag housing in the forward-backward direction of the steering wheel. When the housing cover is rotated relative to the airbag housing, the rear end portion of the housing cover may come into contact with the airbag housing or a steering housing, to which the airbag housing is secured, so as to prevent the housing cover from rotating further.

When the housing cover is rotated upwards relative to the rear end portion of the airbag housing, the front end portion of the housing cover may come into contact with the inner circumferential surface of the steering wheel so as to prevent the housing cover from rotating further.

The housing cover may include side coupling portions bent and extending downwards from both side end portions thereof between the front end portion thereof and the rear end portion thereof. The housing cover may be rotatably coupled to the side surfaces of the airbag housing via the side coupling portions.

The housing cover may be provided with a tear line along which the housing cover is ruptured by the deployment pressure of the airbag cushion.

The tear line may extend along the front end portion of the housing cover in the lateral direction and along both side end portions of the housing cover in the forward-backward direction.

The driver airbag apparatus may further include a reinforcing panel integrally coupled to the housing cover at a position further inward than the tear line. The reinforcing panel may extend in a planar direction parallel to the surface of the housing cover.

The reinforcing panel may be coupled to the airbag housing such that the front end portion thereof is movable upwards. The rear end portion of the reinforcing panel may extend backwards beyond the rear end portion of the airbag housing in the forward-backward direction of the steering wheel. When the reinforcing panel is rotated relative to the airbag housing, the rear end portion of the reinforcing panel may come into contact with the airbag housing or the steering housing, to which the airbag housing is secured, so as to prevent the reinforcing panel from rotating further.

The reinforcing panel may include a bent portion bent at a position further forward than the rear end portion thereof so as to be oriented downwards and to be coupled to the rear end portion of the airbag housing. The reinforcing panel may be rotated relative to the airbag housing about a bending line along which the bent portion is bent.

The reinforcing panel may be provided therein with a slit formed along a portion of the bending line.

The reinforcing panel may include a seating portion bent and extending downwards from the rear end portion thereof, located at a position further backward than the rear end portion of the airbag housing in the forward-backward direction of the steering wheel. The seating portion may have an end portion formed in a shape capable of coming into surface contact with the airbag housing or the steering housing when the reinforcing panel is rotated.

The reinforcing panel may be made of a metal material, and the housing cover may be manufactured through injection molding using a resin material in the state in which the reinforcing panel is inserted thereinto.

When the airbag cushion is deployed, the housing cover covering the opening in the airbag housing may be pressed toward the region behind or above the steering wheel by the deployment pressure of the airbag cushion, and the airbag cushion may be pressed toward the region in front of or below the steering wheel by the housing cover.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
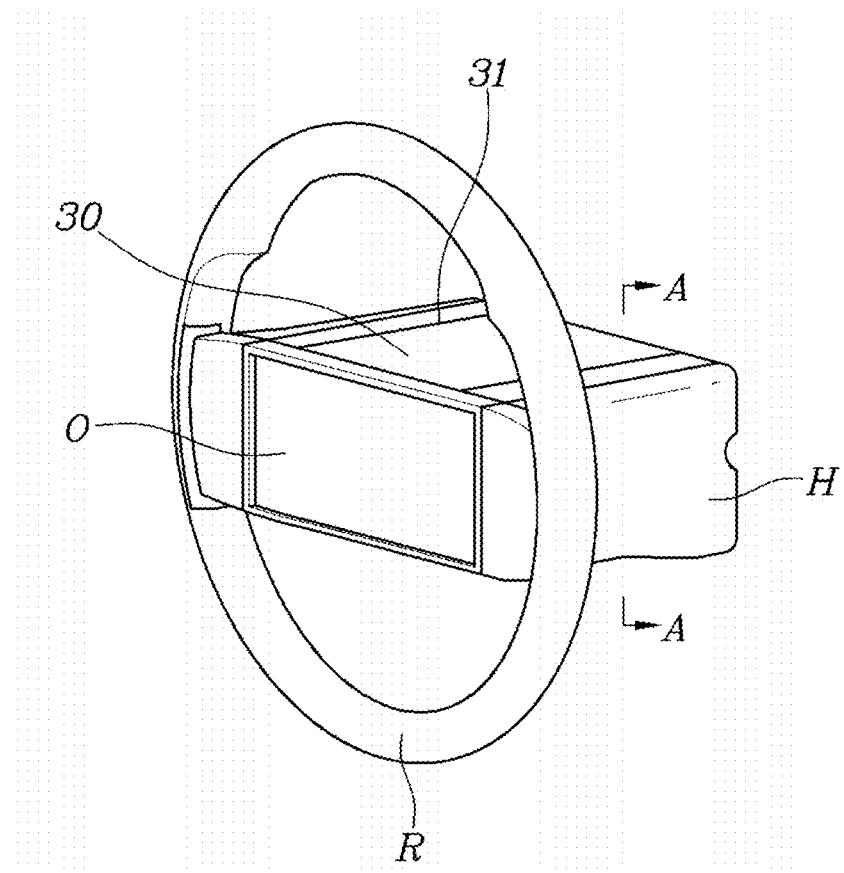
FIG. 1 is a perspective view showing a driver airbag apparatus for a vehicle according to an embodiment of the present invention.

Various exemplary embodiments will now be described more fully with reference to the accompanying drawings, in which only some exemplary embodiments are shown. Specific structural and functional details disclosed herein are merely representative for the purpose of describing exemplary embodiments. The present invention, however, may be embodied in many alternative forms, and should not be construed as being limited only to the exemplary embodiments set forth herein.

Accordingly, while exemplary embodiments of the invention are capable of being variously modified and taking alternative forms, embodiments thereof are shown by way of example in the drawings and will herein be described in detail. It should be understood, however, that there is no intent to limit the present invention to the particular exemplary embodiments disclosed. On the contrary, exemplary embodiments are to cover all modifications, equivalents, and alternatives falling within the scope of the invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, exemplary embodiments of the present invention will be described with reference to the accompanying drawings. In the drawings, the same reference numerals refer to the same components.

Figure 2:
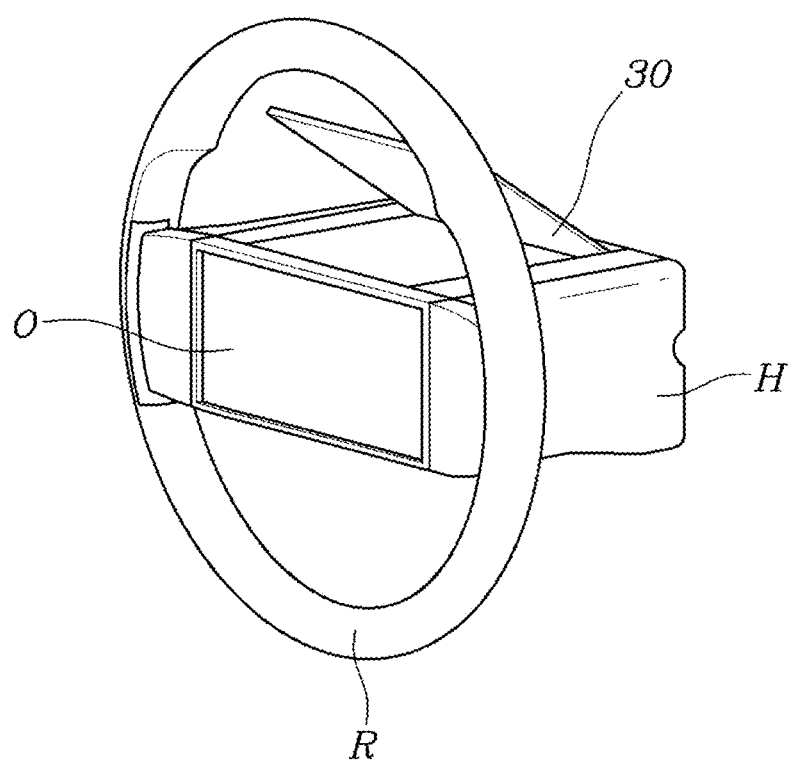
FIG. 2 is a perspective view showing the state in which a housing cover is open in the driver airbag apparatus for a vehicle according to an embodiment of the present invention.
Figure 3:
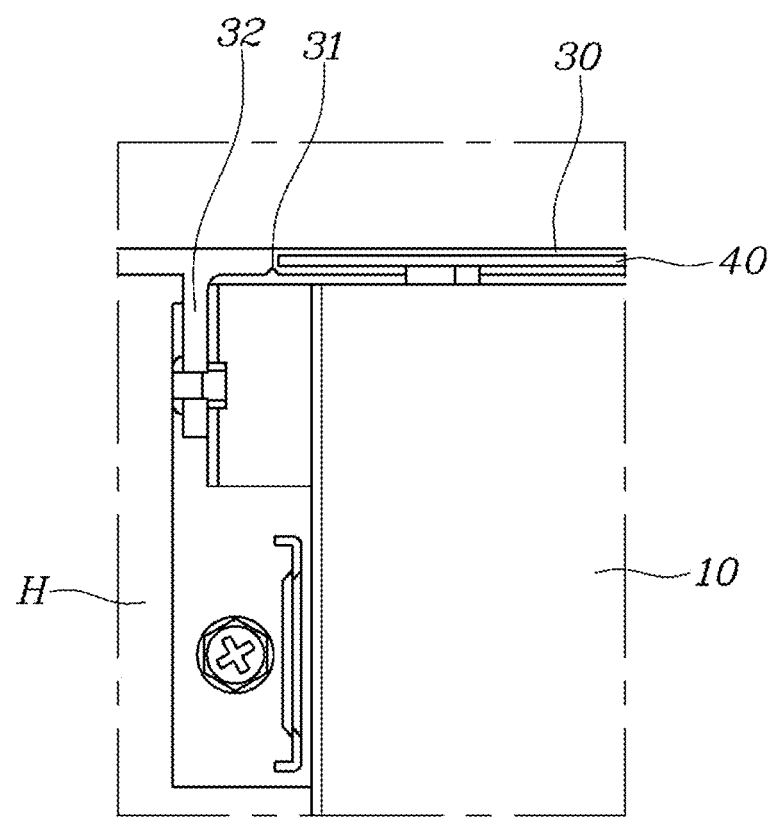
FIG. 3 is a cross-sectional view taken along line A-A in FIG. 1.
Figure 4:
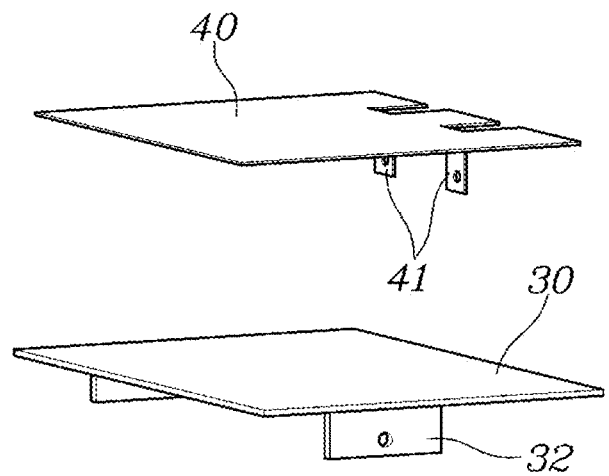
FIG. 4 is an exploded perspective view showing the driver airbag apparatus for a vehicle according to an embodiment of the present invention.
Figure 4:
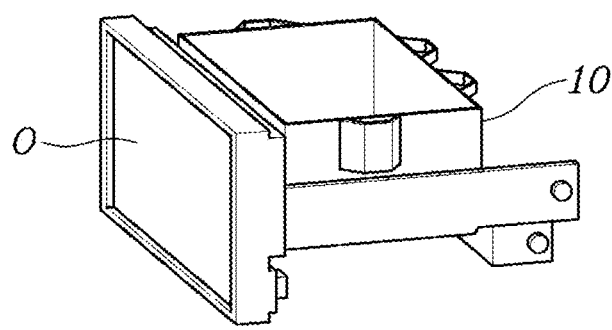
Figure 4:
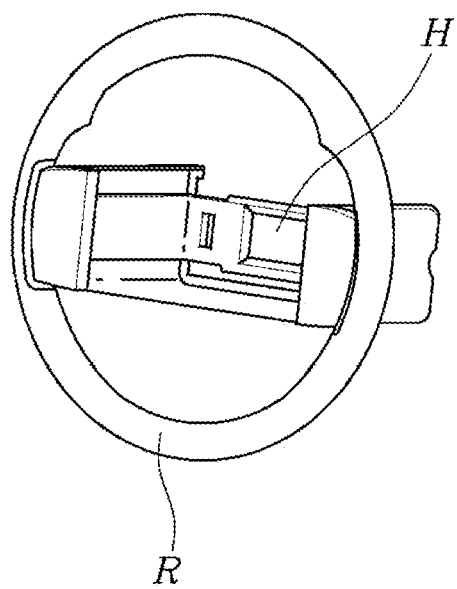

FIG. 1 is a perspective view showing a driver airbag apparatus for a vehicle according to an embodiment of the present invention, FIG. 2 is a perspective view showing the state in which a housing cover 30 is open in the driver airbag apparatus for a vehicle according to an embodiment of the present invention, FIG. 3 is a cross-sectional view taken along line A-A in FIG. 1, and FIG. 4 is an exploded perspective view showing the driver airbag apparatus for a vehicle according to an embodiment of the present invention.

Referring to FIGS. 1 to 4, the driver airbag apparatus for a vehicle according to an embodiment of the present invention is configured to be deployed from the region behind a steering wheel R, which is provided at the center portion thereof with an obstacle O, toward the region in front of the steering wheel R while avoiding the obstacle O. The driver airbag apparatus for a vehicle includes an airbag housing 10, which is disposed behind the steering wheel R, an airbag cushion 20, which is accommodated in the airbag housing 10 and is configured to be deployed by gas injected thereinto toward the region in front of the steering wheel R through the space between the obstacle O and the steering wheel R, and a housing cover 30, which is coupled to the airbag housing 10 so as to cover an opening in the airbag housing 10 and is configured to be ruptured by the deployment pressure of the airbag cushion 20 to open the airbag housing 10 to a limited angle toward the region in front of the steering wheel R.

The steering wheel R may be a rim that is coupled to the obstacle O, which is disposed at the center portion thereof, while surrounding the obstacle O. In addition, as will be described later, a steering housing H may be fixedly coupled to the rear side of the steering wheel R.

The obstacle O may be located at the center portion of the steering wheel R, and the airbag cushion 20, located behind the steering wheel R, may be deployed to the region in front of the steering wheel R while avoiding the obstacle O. Accordingly, the deployment pressure of the airbag cushion 20 is prevented from being applied to the obstacle O, thereby preventing breakage of the obstacle O or scattering of the fragments of the obstacle.

In an embodiment of the present invention, the obstacle O located at the center portion of the steering wheel R may be a display device mounted to the steering wheel R.

The display device may be a screen display device for providing an infotainment service to the driver. For example, the display device may display a screen providing information on the state of the vehicle or navigation-related information.

According to another embodiment, the obstacle O may be a vehicle emblem mounted to the steering wheel R or a vehicle emblem provided with a lighting device.

The airbag housing 10 may be mounted behind the steering wheel R. In particular, the steering housing H may be fixed to the rear side of the steering wheel R, and the airbag housing 10 may be coupled to the steering housing H. In this way, the airbag housing 10 may be mounted behind the steering wheel R. In particular, the airbag housing 10 may be located behind the obstacle O disposed at the center portion of the steering wheel R.

In one embodiment, the airbag housing 10 may be a container having an opening formed in the upper surface thereof. For example, the airbag housing 10 may be formed in the shape of a rectangular parallelepiped having no upper surface.

The airbag cushion 20 may be accommodated in the airbag housing 10. When gas is injected thereinto, the airbag cushion 20 may be deployed toward the region in front of the steering wheel R through the space between the obstacle O and the steering wheel R. In particular, the airbag cushion 20 may be deployed to the outside of the airbag housing 10 through the opening in the airbag housing 10.

A gas-generating device such as an inflator may be accommodated in the airbag housing 10 in order to inject gas into the airbag cushion 20. Alternatively, a gas supply line may be connected to the airbag cushion 20 such that gas is supplied from the outside of the airbag housing 10 to the airbag cushion 20 therethrough.

The housing cover 30 may cover the opening in the airbag housing 10. In one embodiment, the opening in the airbag housing 10 may be formed in the upper surface of the airbag housing 10, and the housing cover 30 may cover the upper surface of the airbag housing 10 from above.

When gas is injected into the airbag cushion 20, the airbag cushion 20 is deployed, and the pressure generated by deployment of the airbag cushion 20 ruptures the housing cover 30, thereby exposing the opening in the airbag housing 10.

Specifically, the housing cover 30 may be rotated relative to the airbag housing 10 to expose the opening in the airbag housing 10. In particular, the housing cover 30 may expose the opening in the airbag housing 10 such that the opening in the airbag housing 10 is oriented toward the region in front of the steering wheel R. Accordingly, it is possible to induce the airbag cushion 20 to be deployed toward the region in front of the steering wheel R.

In addition, the housing cover 30 may limit the angle to which the airbag housing 10 is opened toward the region in front of the steering wheel R. In one embodiment, the rotation of the housing cover 30 relative to the airbag housing 10 is limited within a predetermined angular range, thereby limiting the angle to which the airbag housing 10 is opened.

The housing cover 30 opens the airbag housing 10 to a predetermined limited angle toward the region in front of the steering wheel R, rather than completely exposing the opening in the airbag housing 10 in an upward direction, thereby inducing the airbag cushion 20 to be deployed toward the region in front of the steering wheel R.

The opening in the airbag housing 10 may face the upward direction of the steering wheel R, and the housing cover 30 may be rotated relative to the airbag housing 10 such that the front end portion thereof moves upwards and such that the airbag housing 10 is opened toward the region in front of the steering wheel R.

The housing cover 30 may be rotated relative to the airbag housing 10 such that the front end portion thereof moves upwards. To this end, in one embodiment, the rear end portion of the housing cover 30 may be rotatably coupled to the airbag housing 10.

In another embodiment, a portion of the housing cover 30 between the front end portion thereof and the rear end portion thereof may be rotatably coupled to the airbag housing 10. Accordingly, the housing cover 30 may be rotated relative to the airbag housing 10 such that the front end portion thereof moves upwards and the rear end portion thereof moves downwards.

The rear end portion of the housing cover 30 may extend backwards beyond the rear end portion of the airbag housing 10 in the forward-backward direction of the steering wheel R. Thus, when the housing cover 30 is rotated relative to the airbag housing 10, the rear end portion of the housing cover 30 may come into contact with the airbag housing 10 or the steering housing H, to which the airbag housing 10 is secured, whereby the housing cover 30 may be prevented from rotating further.

When the housing cover 30 is rotated relative to the airbag housing 10 such that the front end portion thereof moves upwards, the rear end portion of the housing cover 30, which extends backwards beyond the rear end portion of the airbag housing 10, may move downwards.

The rear end portion of the housing cover 30, moving downwards, comes into contact with the upper portion of the airbag housing 10 or the steering housing H, thereby preventing the housing cover 30 from rotating further relative to the airbag housing 10. That is, the front end portion of the housing cover 30 may be prevented from moving further upwards. Accordingly, the angle to which the airbag housing 10 is opened toward the region in front of the steering wheel R by the housing cover 30 may be limited.

In another embodiment, when the housing cover 30 is rotated upwards relative to the rear end portion of the airbag housing 10, the front end portion of the housing cover 30 may come into contact with the inner circumferential surface of the steering wheel R, whereby the housing cover 30 may be prevented from rotating further.

In other words, when the front end portion of the housing cover 30, which moves upwards due to the rotation of the housing cover 30, comes into contact with the inner circumferential surface of the steering wheel R and is thus incapable of moving further upwards, the rotation of the housing cover 30 may be stopped.

To this end, the housing cover 30 may be configured such that the front end portion thereof moves forwards so as to come into contact with the steering wheel R, which is located further forwards than the housing cover 30, while moving upwards.

Figure 5:
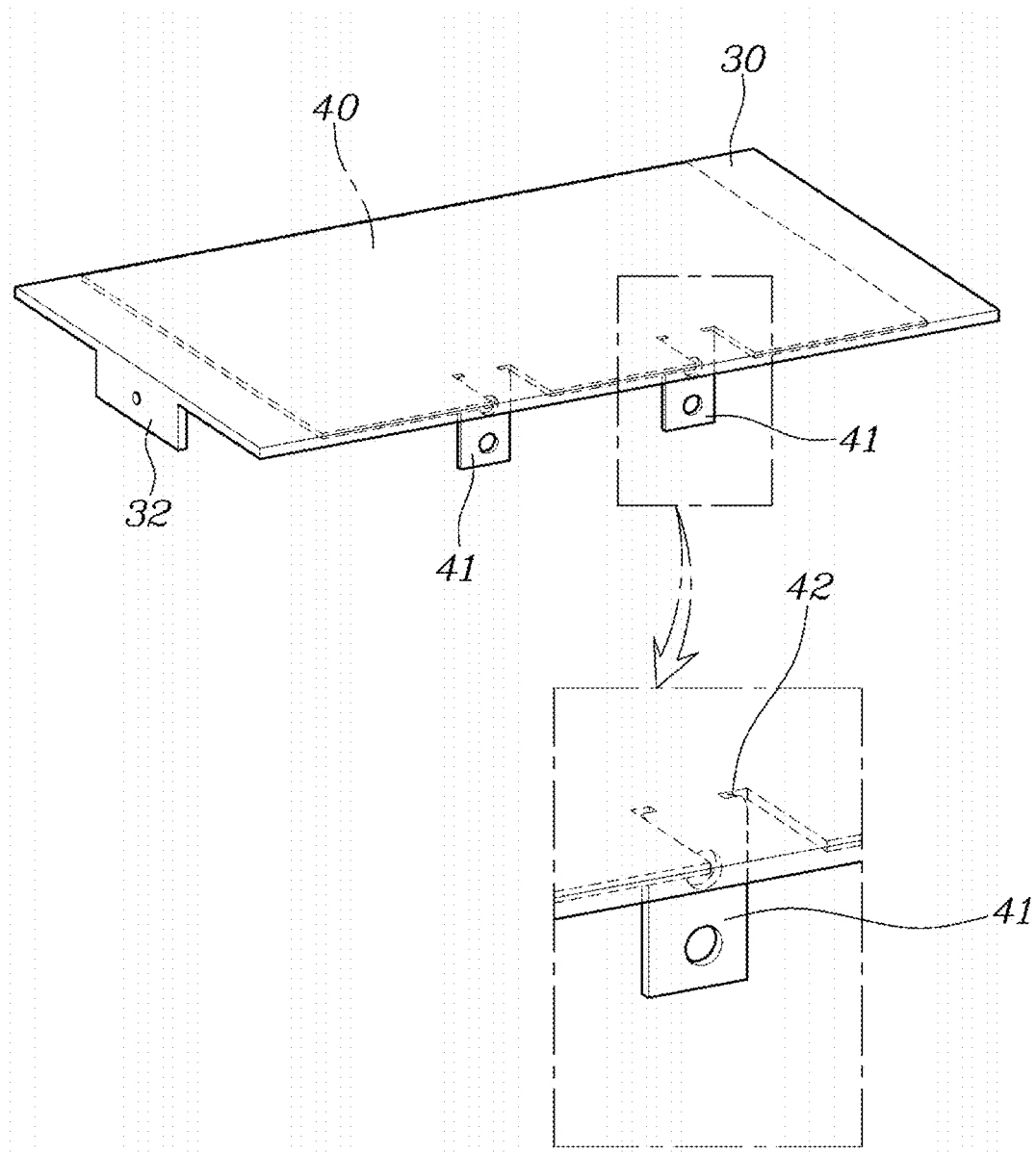
FIG. 5 is a view showing the housing cover and a reinforcing panel according to an embodiment of the present invention.

FIG. 5 is a view showing the housing cover 30 and a reinforcing panel 40 according to an embodiment of the present invention.

Referring to FIG. 5, the housing cover 30 may include side coupling portions that are bent and extend downwards from both side end portions thereof between the front end portion thereof and the rear end portion thereof. The housing cover 30 may be rotatably coupled to the side surfaces of the airbag housing 10 via the side coupling portions.

The side coupling portions of the housing cover 30 may be bent and extend downwards from the center points of both side end portions between the front end portion and the rear end portion so as to be parallel to the side surfaces of the airbag housing 10.

In one embodiment, the side coupling portions of the housing cover 30 may be located at the rear end portion of the airbag housing 10. The rear end portion of the airbag housing 10 may be located further forwards than the rear end portion of the housing cover 30.

The side coupling portions of the housing cover 30 may be rotatably coupled to the side surfaces of the airbag housing 10. In one embodiment, the side coupling portions of the housing cover 30 and the side surfaces of the airbag housing 10 may be provided with insertion pins and through-holes, respectively, so as to be rotatably coupled to each other. In another embodiment, the side coupling portions of the housing cover 30 and the side surfaces of the airbag housing 10 may be hinged to each other.

That is, the housing cover 30 may be coupled to the airbag housing 10 so as to be rotatable about the rotation center, which is spaced apart from the rear end portion thereof. Accordingly, when the housing cover 30 is rotated such that the front end portion thereof moves upwards, the rear end portion thereof moves downwards.

In addition, the side coupling portions of the housing cover 30 may be coupled to the side surfaces of the airbag housing 10 so as to be released therefrom when the deployment pressure of the airbag cushion 20 increases above a predetermined level. In particular, in the case in which the rotation center about which the side coupling portions of the housing cover 30 rotate relative to the side surfaces of the airbag housing 10 differs from the rotation center about which the reinforcing panel 40 rotates, which will be described later, the side coupling portions of the housing cover 30 may be released from the side surfaces of the airbag housing 10 and may rotate about the rotation center of the reinforcing panel 40.

The housing cover 30 may be provided with a tear line along which the housing cover 30 is ruptured by the deployment pressure of the airbag cushion 20.

The tear line 31 may be a line along which the housing cover 30 is torn when the housing cover 30 is pressed upwards by the pressure that is generated when the airbag cushion 20 accommodated in the airbag housing 10 is deployed.

The housing cover 30 may be torn along the tear line 31 by the deployment pressure of the airbag cushion 20, and the torn part of the housing cover 30 may be rotated such that the front end portion thereof moves upwards.

Specifically, the tear line 31 may extend along the front end portion of the housing cover 30 in the lateral direction, and may also extend along both side end portions of the housing cover 30 in the forward-backward direction.

The housing cover 30 may be torn along the tear line extending along the front end portion thereof in the lateral direction and the tear line 31 extending along both side end portions thereof in the forward-backward direction. The portion of the housing cover 30 that is torn along the tear line 31 may be rotated such that the front end portion thereof moves upwards, and accordingly, the rear end portion thereof may move downwards.

The reinforcing panel 40 may be integrally coupled to the housing cover 30 at a position further inward than the tear line 31. The reinforcing panel 40 may extend in a planar direction parallel to the surface of the housing cover 30.

That is, the tear line 31 of the housing cover 30 may be located outside the reinforcing panel 40. In particular, as shown in FIG. 3, the tear line 31, which extends along both side end portions of the housing cover 30 in the forward-backward direction, may be located between the side coupling portions of the housing cover 30 and the side edges of the reinforcing panel 40.

Accordingly, a portion of the housing cover 30, to which the reinforcing panel 40 is integrally coupled, is torn along the tear line 31 and is rotated relative to the airbag housing 10.

The reinforcing panel 40 may be coupled to the airbag housing 10 such that the front end portion thereof is movable upwards. The rear end portion of the reinforcing panel 40 may extend backwards beyond the rear end portion of the airbag housing 10 in the forward-backward direction of the steering wheel R. Thus, when the reinforcing panel 40 is rotated relative to the airbag housing 10, the rear end portion of the reinforcing panel 40 may come into contact with the airbag housing 10 or the steering housing H, to which the airbag housing 10 is secured, whereby the reinforcing panel 40 may be prevented from rotating further.

The reinforcing panel 40 may be coupled to the airbag housing 10 such that the front end portion thereof is movable upwards together with the front end portion of the housing cover 30. In addition, the rear end portion of the reinforcing panel 40 may extend backwards beyond the rear end portion of the airbag housing 10 so as to be movable downwards together with the rear end portion of the housing cover 30 when the reinforcing panel 40 is rotated.

Accordingly, when the housing cover 30 and the reinforcing panel 40 are rotated, the rear end portion of the housing cover 30 and the rear end portion of the reinforcing panel 40 may move downwards at the same time, and may come into contact with the airbag housing 10 or the steering housing H.

The reinforcing panel 40 may include a bent portion 41, which is bent at a position further forward than the rear end portion thereof so as to be oriented downwards. The bent portion 41 of the reinforcing panel 40 may be coupled to the rear end portion of the airbag housing 10. The reinforcing panel 40 may be rotated relative to the airbag housing 10 about the bending line, along which the bent portion 41 is bent.

The bent portion 41 may be located further forwards than the rear end portion of the reinforcing panel 40, and may be oriented downwards. The bent portion 41, which is oriented downwards, may extend parallel to the rear surface of the airbag housing 10, and may be coupled to the rear end portion of the airbag housing 10 at the rear surface of the airbag housing 10.

The bending line may be formed by cutting portions of the reinforcing panel 40. In one embodiment, in order to form the bending line, portions of the reinforcing panel 40 may be cut in the upward-downward direction, or may be further cut in the direction in which the bending line extends.

The reinforcing panel 40 may be rotated relative to the airbag housing 10 about the bending line along which the bent portion 41 is bent so as to be oriented downwards and to be coupled to the rear end portion of the airbag housing 10. That is, the reinforcing panel 40 may be rotatably coupled to the airbag housing 10.

In one embodiment, the reinforcing panel 40 may have therein a slit 42 formed along a portion of the bending line. Accordingly, the reinforcing panel 40 may be rotated even by a small amount of deployment pressure of the airbag cushion 20 about the bending line, along which the bent portion 41 is bent, so as to be oriented downwards.

It is possible to adjust the rotational rigidity of the reinforcing panel 40 by varying the length of the slit 42. In particular, when the slit 42 is relatively long, the reinforcing panel 40 may be easily rotated by a relatively small amount of deployment pressure of the airbag cushion 20, and when the slit 42 is relatively short, the rotation of the reinforcing panel 40 may be relatively strongly impeded.

In another embodiment, portions of the reinforcing panel 40 may be intermittently cut along the bending line.

In one embodiment, the reinforcing panel 40 may be made of a metal material, and the housing cover 30 may be manufactured through injection molding using a resin material in the state in which the reinforcing panel 40 is inserted thereinto.

Specifically, the reinforcing panel 40 may be made of a material having relatively high rigidity, and the housing cover 30 may be made of a material having lower rigidity than the material of the reinforcing panel 40. Accordingly, the reinforcing panel 40 and the portion of the housing cover 30 to which the reinforcing panel 40 is coupled may be prevented from being damaged when the deployment pressure of the airbag cushion 20 is applied thereto or when the rear end portion thereof comes into contact with the airbag housing 10 or the steering housing H.

However, when the deployment pressure of the airbag cushion 20 is applied thereto, the housing cover 30 may be easily torn or ruptured along the tear line 31 formed in the housing cover 30 at a position outside the reinforcing panel 40.

The housing cover 30 may be manufactured by injecting a resin material into a mold cavity containing the reinforcing panel 40 such that the reinforcing panel 40 is inserted into the housing cover 30. In this way, the housing cover 30 may be integrally coupled to the reinforcing panel 40 through a simple process.

Figure 6:
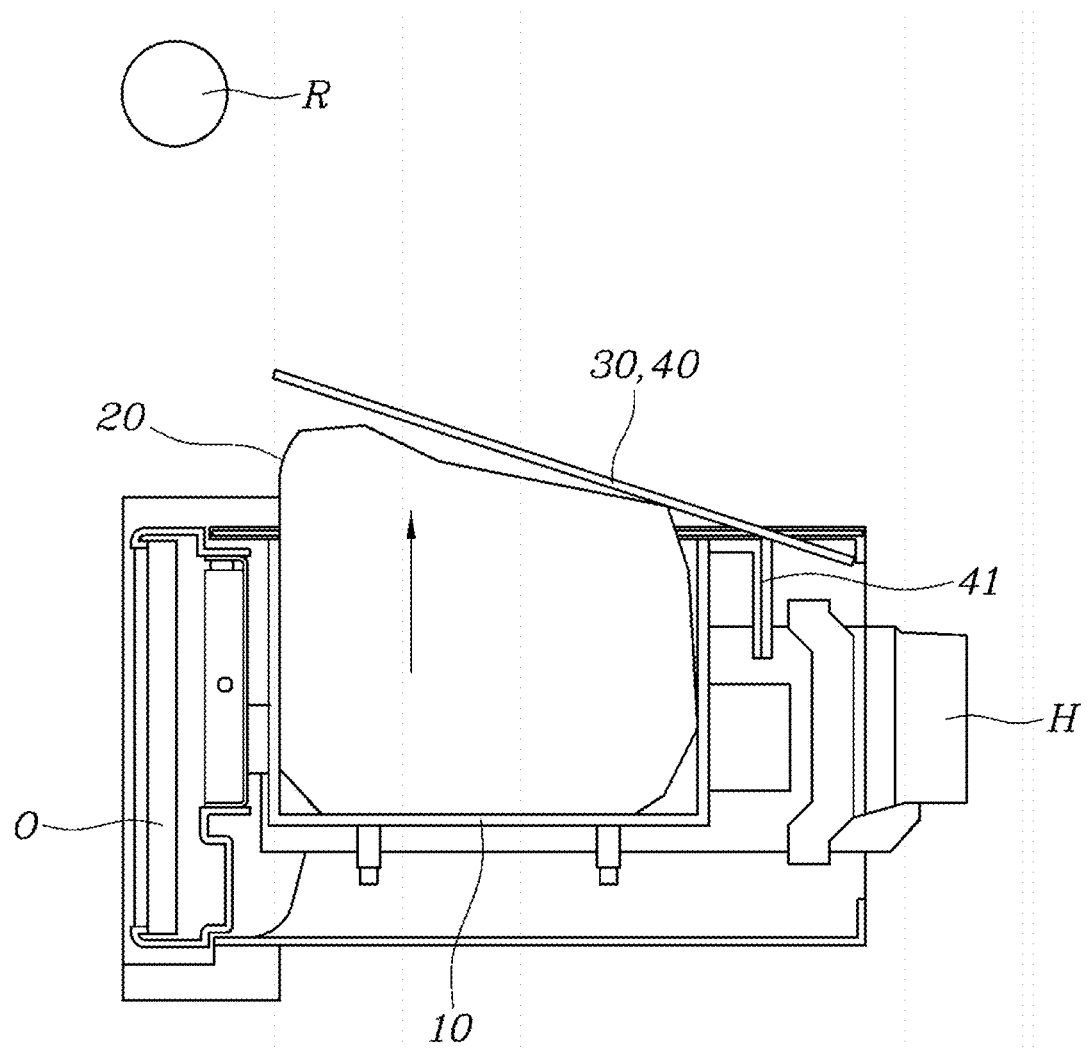
FIGS. 6 and 7 are views sequentially showing the operation of the driver airbag apparatus for a vehicle according to an embodiment of the present invention.
Figure 7:
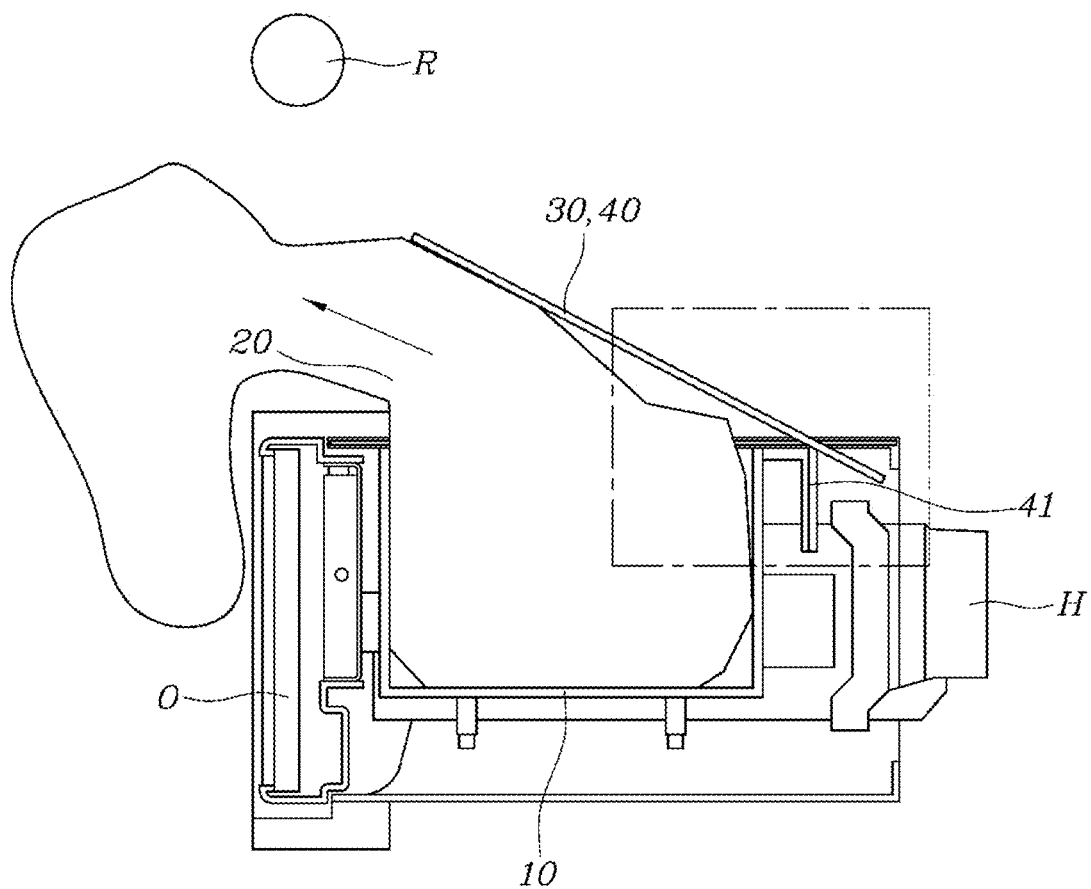
Figure 8:
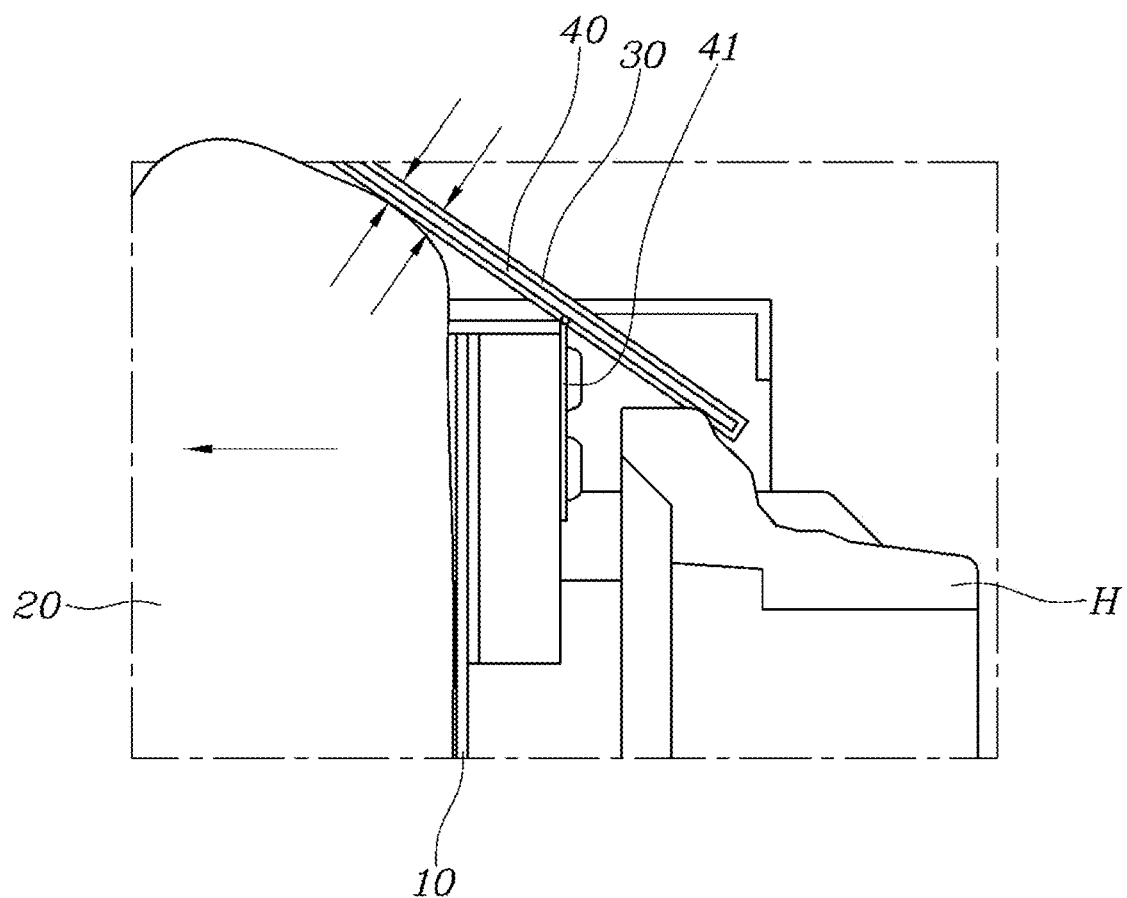
FIG. 8 is an enlarged view of a part of FIG. 7.

FIGS. 6 and 7 are views sequentially showing the operation of the driver airbag apparatus for a vehicle according to an embodiment of the present invention, and FIG. 8 is an enlarged view of a part of FIG. 7.

Referring to FIGS. 6 to 8, when the airbag cushion 20 is deployed, the housing cover 30, covering the opening in the airbag housing 10, may be pressed toward the region behind or above the steering wheel R by the deployment pressure of the airbag cushion 20, and the airbag cushion 20 may be pressed in turn toward the region in front of or below the steering wheel R by the housing cover 30.

When the airbag cushion 20 is deployed inside the airbag housing 10, the housing cover 30 may be pressed upwards by the deployment pressure of the airbag cushion 20. The housing cover 30 may be torn along the tear line 31, and may be rotated such that the front end portion thereof moves upwards. As the housing cover 30 is rotated further, the housing cover 30 may be pressed backwards, rather than upwards, by the deployment pressure of the airbag cushion 20.

The housing cover 30 may press the airbag cushion 20 in reaction to the deployment pressure of the airbag cushion 20 applied to the housing cover 30. In the state in which the airbag cushion 20 is accommodated in the airbag housing 10, the housing cover 30 may press the airbag cushion 20 downwards. As the housing cover 30 is rotated, the housing cover 30 may press the airbag cushion 20 forwards, rather than downwards.

When the rotation of the housing cover 30 is stopped at a predetermined limited angle such that the housing cover 30 is obliquely oriented toward the region in front of the steering wheel R, the housing cover 30 may obliquely press the airbag cushion 20 toward a region between the region below the steering wheel R and the region in front of the steering wheel R. As a result, the airbag cushion 20 may be deployed toward the region in front of the steering wheel R.

Figure 9:
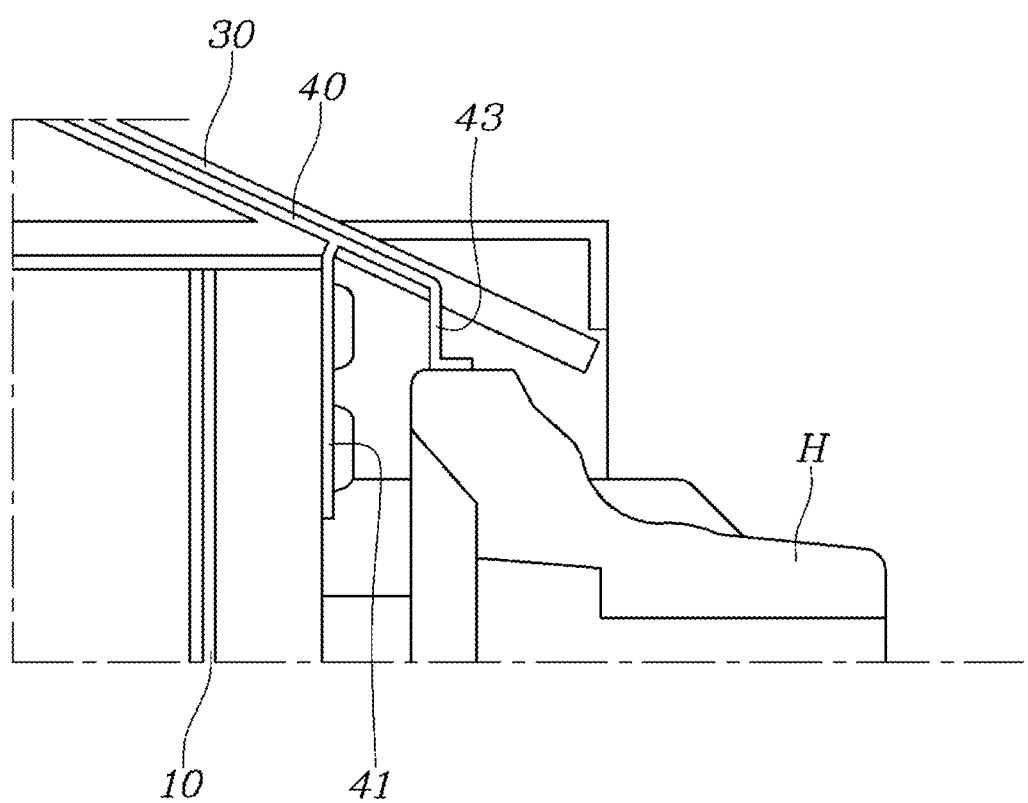
FIG. 9 is an enlarged view showing a reinforcing panel according to another embodiment of the present invention.

FIG. 9 is an enlarged view showing a reinforcing panel 40 according to another embodiment of the present invention.

Referring to FIG. 9, the reinforcing panel 40 may include a seating portion 43 formed at the rear end portion thereof, which is located at a position further backward than the rear end portion of the airbag housing 10 in the forward-backward direction of the steering wheel R. The seating portion 43 may be bent and extend downwards from the rear end portion of the reinforcing panel 40, and may have an end portion formed in a shape capable of coming into surface contact with the airbag housing 10 or the steering housing H when the reinforcing panel 40 is rotated.

The seating portion 43, which is bent and extends downwards from the rear end portion of the reinforcing panel 40, serves to reduce the angle to which the airbag housing 10 is opened by the rotation of the reinforcing panel 40 and the housing cover 30. That is, the rotation of the reinforcing panel 40 and the housing cover 30 is limited within a reduced angular range.

In addition, the end portion of the seating portion 43 may be formed in a shape capable of coming into surface contact with the airbag housing 10 or the steering housing H.

That is, the end portion of the seating portion 43, which comes into contact with the airbag housing 10 or the steering housing H in order to prevent the reinforcing panel 40 from being rotated beyond a predetermined limited angle, may be formed in a shape corresponding to the contact surface of the airbag housing 10 or the steering housing H. Accordingly, the seating portion 43 of the reinforcing panel 40 may be stably supported by the airbag housing 10 or the steering housing H without being damaged or deformed.

As is apparent from the above description, a driver airbag apparatus for a vehicle according to the present invention induces an airbag cushion to be deployed in a manner that avoids a display device mounted to a steering wheel of a vehicle, thereby preventing breakage of the display device and safely protecting an occupant.

In addition, since the angle to which a housing cover is rotated is limited, it is possible to securely induce the airbag cushion to be deployed toward the region in front of the steering wheel.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driver airbag apparatus for a vehicle configured to be deployed from a region behind a steering wheel, having at a center portion thereof an obstacle, toward a region in front of the steering wheel while avoiding the obstacle, the driver airbag apparatus comprising:
    an airbag housing disposed behind the steering wheel;
    an airbag cushion accommodated in the airbag housing, the airbag cushion being configured to be deployed by gas injected thereinto toward the region in front of the steering wheel through a space between the obstacle and the steering wheel; and
    a housing cover coupled to the airbag housing so as to cover an opening in the airbag housing, the housing cover being configured to be ruptured by deployment pressure of the airbag cushion to open the airbag housing to a limited angle toward the region in front of the steering wheel,
    wherein the housing cover is rotated relative to the airbag housing such that a front end portion thereof moves upwards and such that the airbag housing is opened toward the region in front of the steering wheel, and
    wherein a rear end portion of the housing cover extends backwards beyond a rear end portion of the airbag housing in a forward-backward direction of the steering wheel, and wherein, when the housing cover is rotated relative to the airbag housing, the rear end portion of the housing cover comes into contact with the airbag housing or a steering housing, to which the airbag housing is secured, so as to prevent the housing cover from rotating further.

2. The driver airbag apparatus of claim 1, wherein the obstacle located at the center portion of the steering wheel is a display device mounted to the steering wheel.

3. The driver airbag apparatus of claim 1, wherein the housing cover comprises side coupling portions bent and extending downwards from both side end portions thereof between the front end portion thereof and the rear end portion thereof, and
    wherein the housing cover is rotatably coupled to side surfaces of the airbag housing via the side coupling portions.

4. The driver airbag apparatus of claim 1, wherein, when the airbag cushion is deployed, the housing cover covering the opening in the airbag housing is pressed toward the region behind or above the steering wheel by the deployment pressure of the airbag cushion, and
    wherein the airbag cushion is pressed toward the region in front of or below the steering wheel by the housing cover.

5. The driver airbag apparatus of claim 1, wherein the housing cover is provided with a tear line along which the housing cover is ruptured by the deployment pressure of the airbag cushion.

6. The driver airbag apparatus of claim 5, wherein the tear line extends along a front end portion of the housing cover in a lateral direction and along both side end portions of the housing cover in the forward-backward direction.

7. The driver airbag apparatus of claim 5, further comprising:
    a reinforcing panel integrally coupled to the housing cover at a position further inward than the tear line,
    wherein the reinforcing panel extends in a planar direction parallel to a surface of the housing cover.

8. The driver airbag apparatus of claim 7, wherein the reinforcing panel is made of a metal material, and
    wherein the housing cover is manufactured through injection molding using a resin material in a state in which the reinforcing panel is inserted thereinto.

9. The driver airbag apparatus of claim 7, wherein the reinforcing panel is coupled to the airbag housing such that a front end portion thereof is movable upwards,
    wherein a rear end portion of the reinforcing panel extends backwards beyond the rear end portion of the airbag housing in the forward-backward direction of the steering wheel, and
    wherein, when the reinforcing panel is rotated relative to the airbag housing, the rear end portion of the reinforcing panel comes into contact with the airbag housing or the steering housing, to which the airbag housing is secured, so as to prevent the reinforcing panel from rotating further.

10. The driver airbag apparatus of claim 9, wherein the reinforcing panel comprises a seating portion bent and extending downwards from the rear end portion thereof, located at a position further backward than the rear end portion of the airbag housing in the forward-backward direction of the steering wheel, and
    wherein the seating portion comprises an end portion formed in a shape capable of coming into surface contact with the airbag housing or the steering housing when the reinforcing panel is rotated.

11. The driver airbag apparatus of claim 9, wherein the reinforcing panel comprises a bent portion bent at a position further forward than the rear end portion thereof so as to be oriented downwards and to be coupled to the rear end portion of the airbag housing, and
    wherein the reinforcing panel is rotated relative to the airbag housing about a bending line along which the bent portion is bent.

12. The driver airbag apparatus of claim 11, wherein the reinforcing panel is provided therein with a slit formed along a portion of the bending line.

13. A driver airbag apparatus for a vehicle configured to be deployed from a region behind a steering wheel, having at a center portion thereof an obstacle, toward a region in front of the steering wheel while avoiding the obstacle, the driver airbag apparatus comprising:
    an airbag housing disposed behind the steering wheel;
    an airbag cushion accommodated in the airbag housing, the airbag cushion being configured to be deployed by gas injected thereinto toward the region in front of the steering wheel through a space between the obstacle and the steering wheel; and
    a housing cover coupled to the airbag housing so as to cover an opening in the airbag housing, the housing cover being configured to be ruptured by deployment pressure of the airbag cushion to open the airbag housing to a limited angle toward the region in front of the steering wheel, wherein the housing cover is rotated relative to the airbag housing such that a front end portion thereof moves upwards and such that the airbag housing is opened toward the region in front of the steering wheel, and wherein, when the housing cover is rotated upwards relative to a rear end portion of the airbag housing, the front end portion of the housing cover comes into contact with an inner circumferential surface of the steering wheel so as to prevent the housing cover from rotating further.

14. A driver airbag apparatus for a vehicle configured to be deployed from a region behind a steering wheel, having at a center portion thereof an obstacle, toward a region in front of the steering wheel while avoiding the obstacle, the driver airbag apparatus comprising:

an airbag housing disposed behind the steering wheel;

an airbag cushion accommodated in the airbag housing, the airbag cushion being configured to be deployed by gas injected thereinto toward the region in front of the steering wheel through a space between the obstacle and the steering wheel;

a housing cover coupled to the airbag housing so as to cover an opening in the airbag housing, the housing cover being configured to be ruptured by deployment pressure of the airbag cushion to open the airbag housing to a limited angle toward the region in front of the steering wheel, wherein the housing cover is provided with a tear line along which the housing cover is ruptured by the deployment pressure of the airbag cushion; and a reinforcing panel integrally coupled to the housing cover at a position further inward than the tear line, wherein the reinforcing panel extends in a planar direction parallel to a surface of the housing cover, wherein a rear end portion of the reinforcing panel extends backwards beyond a rear end portion of the airbag housing in a forward-backward direction of the steering wheel, and wherein, when the reinforcing panel is rotated relative to the airbag housing, the rear end portion of the reinforcing panel comes into contact with the airbag housing or a steering housing, to which the airbag housing is secured, so as to prevent the reinforcing panel from rotating further.

15. The driver airbag apparatus of claim 14, wherein the reinforcing panel comprises a bent portion bent at a position further forward than the rear end portion thereof so as to be oriented downwards and to be coupled to the rear end portion of the airbag housing, and wherein the reinforcing panel is rotated relative to the airbag housing about a bending line along which the bent portion is bent.

16. The driver airbag apparatus of claim 15, wherein the reinforcing panel is provided therein with a slit formed along a portion of the bending line.

17. The driver airbag apparatus of claim 14, wherein the reinforcing panel comprises a seating portion bent and extending downwards from the rear end portion thereof, located at a position further backward than the rear end portion of the airbag housing in the forward-backward direction of the steering wheel, and wherein the seating portion comprises an end portion formed in a shape capable of coming into surface contact with the airbag housing or the steering housing when the reinforcing panel is rotated.

18. The driver airbag apparatus of claim 14, wherein the reinforcing panel is made of a metal material, and wherein the housing cover is manufactured through injection molding using a resin material in a state in which the reinforcing panel is inserted thereinto.

* * * * *